United States Patent [19]
den Herder et al.

[11] 3,751,887
[45] Aug. 14, 1973

[54] DEVICES FOR MECHANICALLY CLEARING WATERWAYS, PARTICULARLY DITCHES

[75] Inventors: Johannes den Herder; Pieter Willem den Herder, both of Serooskerke, Netherlands

[73] Assignee: Firma Gebroeder den Herder, Serooskerke, Netherlands

[22] Filed: May 19, 1971

[21] Appl. No.: 145,056

Related U.S. Application Data

[63] Continuation of Ser. No. 821,204, May 2, 1969, abandoned.

[52] U.S. Cl. .................................................. 56/8
[51] Int. Cl. ............................................. A01d 45/18
[58] Field of Search ............................... 56/8, 233

[56] References Cited
UNITED STATES PATENTS

| | | | |
|---|---|---|---|
| 2,050,133 | 8/1936 | Smith | 56/8 |
| 3,499,271 | 3/1970 | Drigert et al. | 56/8 |
| 3,407,577 | 10/1968 | Fiske | 56/8 |
| 1,785,492 | 12/1930 | Orloff | 56/8 |

*Primary Examiner*—Robert Peshock
*Attorney*—Paul M. Denk

[57] ABSTRACT

In a device for clearing waterways of plant life or other growth, a king post assembly mounts upon a vehicle, with said post being swingable with respect to its mounting, and includes a multi-sectioned boom having a hydraulically controlled mowing receptacle including a cutter bar positioned at its extremity.

12 Claims, 4 Drawing Figures

Patented Aug. 14, 1973 3,751,887

INVENTORS
JOHANNES DEN HERDER
PIETER WILLEM DEN HERDER
BY Paul M. Henk
ATTORNEY

DEVICES FOR MECHANICALLY CLEARING WATERWAYS, PARTICULARLY DITCHES

This application is a streamline continuation of application Ser. No. 821,204 filed May 2, 1969, and now abandoned.

BACKGROUND OF THE INVENTION

This invention relates to devices for clearing water ways, particularly ditches.

The clearing of ditches from objectional growth of plants constitutes a problem. The expenses involved are considerable and if done by hand it is very disagreeable work for which fewer and fewer labourers can be found.

A device is known consisting of two vehicles which can be driven on and along opposite banks of a ditch and which are connected by draw-cables intended to draw clearing members back and forth, which clearing members include means for cutting off the plants and a second means for removing the cut off plant parts.

This device exhibits some disadvantages. In the first place both vehicles need an operator so that always two persons are required for operating the device. In the second the banks at either side of the ditch must not have any obstructions such as barbed wire fences, hedges, trees and the like. Furthermore, transverse ditches and sharp bends offer great difficulties. The vehicles have to operate rather close to the ditches which may cause the banks to subside or even the vehicles to overturn. Furthermore, in this way only the ditch itself is cleared and, if the adjacent land level must also be cleared separate mowing means has to be arranged in front of the vehicles.

For the deepening or dredging of ditches and the digging of trenches a hydraulically actuated shovel excavator, which only requires one man and can excavate beyond obstructions, is sometimes used. The problem of the removal of plant growth, can, however, not be solved in this way. And this unsolved problem each year devours big sums of money.

Surprisingly it appears that such an excavator can solve the problem if, instead of the shovel, cutting-off and collecting element is provided which, over a length of the ditch and the banks corresponding to that of the element cuts off the plant, collects the cut-off parts, and deposits them on the banks.

SUMMARY OF THE INVENTION

The invention provides a device for mechanically clearing water ways, particularly ditches, comprising a king post assembly mounted on a vehicle, a vertically swingable multi-section boom carried by the king post assembly an hydraulically controllable mowings receptacle with a cutter bar positioned at the side away from the carrying point, by which the mowings receptacle is connected to the boom which cutter bar can be driven by means of a driving mechanism mounted on the mowings receptacle and which driving mechanism can be controlled from the vehicle.

The driving mechanism may be a pressure, oil actuated motor or the like which is not damaged by an immersion into water. This motor may be mounted on the supporting beam of the mowings receptacle or upon a supporting element mounted laterally of the receptacle.

The mowings receptacle consists preferably of a number of bars but may also consist of perforated plate. The construction with bars, however, is lighter, which is of importance.

Besides cutting off plants in a ditch or on its banks, the device according to the invention may also be applied for clipping hedges and the like, and in this it is of importance that the mowings receptacle (and therefore the cutter bar thereof) can be positioned at widely varying angles with the horizontal plane.

DESCRIPTION OF THE PREFERRED EMBODIMENTS

Figure 1:
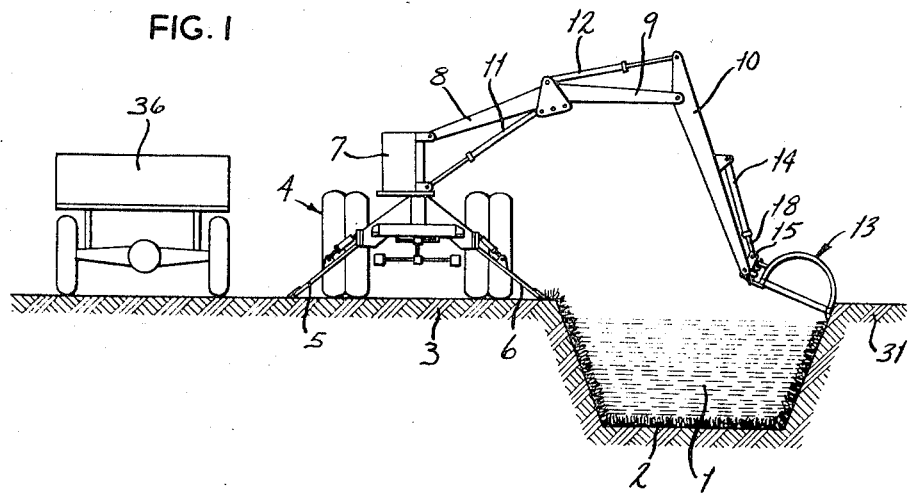
FIG. 1 shows a diagrammatical view of an embodiment of the device seen in the longitudinal direction of a ditch.
Figure 2:
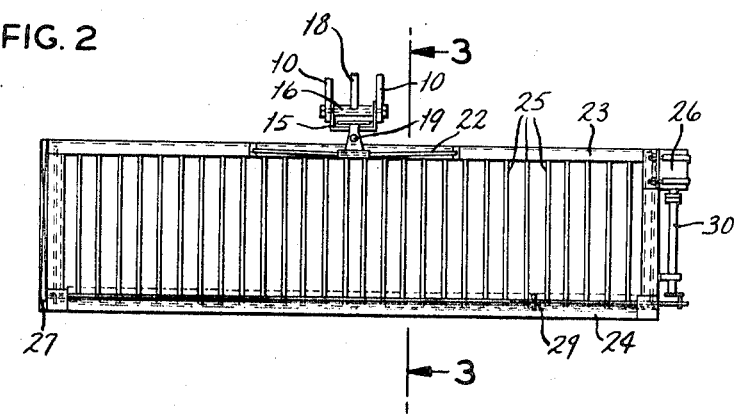
FIG. 2 shows a view of the mowings receptacle of the device in the position of FIG. 3 and seen in that Figure from the left.
Figure 3:
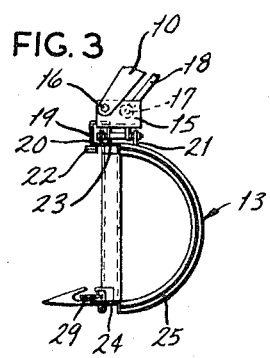
FIG. 3 shows a cross section along the line III—III of FIG. 2.
Figure 4:
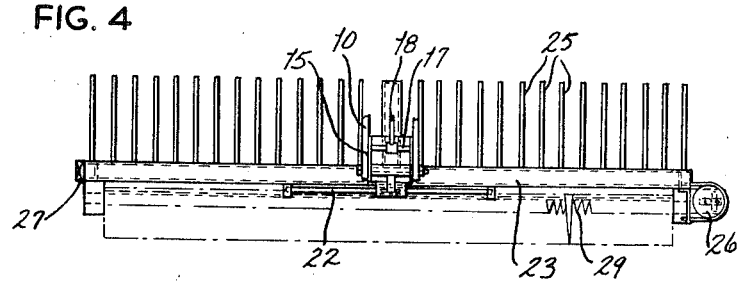
FIG. 4 shows a top view of FIG. 3 of the mowings receptacle.

The device according to the invention shown in FIG. 1 has been drawn in the position, in which a ditch 1 is to be cleared of plant growth 2. On the one bank 3 of the ditch a tractor 4 is positioned and is supported by two hydraulic jacks 5 and 6 which operate independently of one another, in order to be able to operate on uneven ground.

The jacks 5 and 6 carry a king post structure 7 which has a triple sectional boom, consisting of boom arms 8 and 9 and a main arm 10. The kingpost structure 7 may revolve about a verticle shaft axis through more than 360°. The boom arms 8 and 9 may be moved upwards and downwards by means of an hydraulically actuated piston and cylinder unit 11. The main arm 10 can also be moved by means of an hydraulically actuated piston and cylinder unit 12, the fluid pipes of which have been omitted. A mowings receptacle 13 mounted at the outer end of the main arm 10 may be moved relative to said arm by means of the hydraulically actuated piston and cylinder unit 14. The fluid supply pipes (not shown) for the hydraulic actuators of the device will be mounted at, in or on the king post structure 7, the arms 8 and 9 and the main arm 10. The length of the respective arms is adapted to the purpose in view. In most cases the main arm 10 is short.

At its extremities the main arm 10 is divided into two limbs on which a U-shaped frame 15 is pivotally mounted by means of a bolt 16. The plunger member 18 of an hydraulically actuated piston and cylinder unit 14 is connected to the frame 15 by means of a pivot bolt 17. The frame 15 mounts a shaft 19 from which is suspended, by means of lugs receptacle 13. In order to cushion pivotal 20 and 21, a supporting beam 23 of the movement of the beam 23 with respect to the frame 15 a leaf spring 22 is provided with its opposite ends fixed to the beam 23 and with its center clamped by a bracket fast with the frame 15.

The mowings receptacle 13 consists mainly of the supporting beam 23 which is connected with a cutter bar 24 by a number of semi-circular bars 25.

For simplicity's sake the pressure oil actuated motor 26 has been mounted at the one end of the supporting beam 23 in the embodiment shown. However, this motor should preferable be mounted on the supporting beam 23 near the point of suspension, in order to obtain a better distribution of weight. At the other side of the supporting beam 23 and extending to the cutter bar 24 a counterweight 27 may, if so desired, be positioned. The driving of the teeth of the cutter bar (not completely shown) occurs by means of one or more transmission devices 30.

The device operates as follows:

After the tractor 4 has been brought to the intended place and the hydraulic forks 5 and 6 have been properly extended, the king post structure 7 is in such a way that the boom is perpendicular to the direction of the ditch. Now the attendant manipulates the device, by adjusting the hydraulic piston and cylinder units 11, 12, and 14, in such a way that the mowings receptacle 13 arrives at the position indicated in FIG. 1. If so desired the mowings receptacle 13 may also be moved firstly over and adjacent to ground 31, adjacent the far side of the ditch, in order to remove plant growth therefrom. The motor 26 is started and the mowings receptacle 13 is moved with a suitable velocity over the ground 31 and through the ditch 1, the position of the teeth 29 of the cutter bar being kept parallel with the ground 31, the slope and the bottom of the ditch 1. The cut off plant parts 2 are gathered in the receptacle 13 and water and earth pass through the bars 25. Subsequently the mowings receptacle 13 is transferred to the other side of the tractor 4 and the contents are deposited in a vehicle 36 alongside this tractor. As the case may be, the contents may also be deposited behind or beside the tractor 4 on the bank.

By a suitable positioning of the mowings receptacle 13 hedges and the like may also be clipped in this way.

It will be clear that trees on the right hand bank of the ditch 1 will give no trouble, while barbed wire fences on the left present little obstruction as the boom can reach beyond them.

We claim:

1. A device for mechanically clearing waterways, particularly ditches, comprising a king post assembly mounted on a vehicle, a vertically swingable multi section boom carried by the king post assembly, an hydraulically controllable mowings receptacle with a cutter bar positioned at the side away from the carrying point by which the mowings receptacle is connected to the boom which cutter bar can be driven by means of a driving mechanism mounted on the mowings receptacle and which driving mechanism can be controlled from the vehicle.

2. A device according to claim 1, characterized by the driving mechanism for the cutter-bar being a motor actuated by oil supplied under pressure.

3. A device according to claim 2 wherein the driving mechanism for the cutter-bar is mounted on the mowings receptacle.

4. A device according to claim 1 characterized by the mowings receptacle comprising a supporting beam and a cutter-bar interconnected by semi-circular bars 5. A device for mechanically clearing waterways, particularly ditches, comprising a vehicle, mounting means having a substantially vertical axis of rotation mounted upon said vehicle, a vertically swingable multi section boom connecting at one end to said mounting means, a receptacle incorporating a cutter bar pivotally connecting at the other end of said boom, a shaft providing the pivotal connection between said receptacle and the boom, said shaft being substantially parallel to said cutter bar, and a motor mounted on said receptacle and providing the force for driving the cutter bar, said motor comprising an oil pressure actuated motor.

6. The device according to claim 5, wherein said mowing receptacle is mounted to the multi section boom by means of a first shaft that extends parallel to the cutter bar and a second shaft that extends perpendicular to said first shaft and the cutter bar.

7. A device for mechanically clearing waterways, particularly ditches, comprising a vehicle, a mounting means pivotally mounted upon said vehicle, a vertically swingable multi section boom carried by said mounting means, a mowing receptacle incorporating a cutter bar connecting to the other end of said boom, a horizontal pivot means providing the means for connection between said boom and the mowing receptacle and extending at least substantially parallel to said cutter bar and the pivot axes of the multi section boom.

8. The invention of claim 7 wherein said mowing receptacle comprises a supporting beam having a cutter-bar spaced therefrom and interconnected by substantially semi-circular bars, said connecting means extending substantially parallel to said supporting beam and said cutter-bar.

9. The mowing receptacle according to claim 8 and further characterized by said pivot means including an additional means for pivotal connection that extends perpendicularly to said first pivot axis and to said cutter-bar.

10. The mowing receptacle of claim 9 including a spring means attaching to said supporting beam and co-operating with said pivot means to stabilize the mounting of said receptacle to the boom.

11. The receptacle according to claim 8 and further characterized by a driving mechanism for said cutter bar, said driving mechanism being formed from a motor being actuated by an oil supply under pressure that is mounted on the receptacle.

12. A device for mechanically clearing waterways, particularly ditches, comprising a vehicle, mounting means having a substantially vertical axis of rotation mounted upon said vehicle, and vertically swingable multi section boom connecting at one end to said mounting means, a receptacle incorporating a cutter bar pivotally connecting at the other end of said boom, a motor mounted on said receptacle and providing the force for driving the cutter bar, said motor comprising an oil pressure actuated motor.

* * * * *